United States Patent [19]

Smith

[11] 4,339,178

[45] Jul. 13, 1982

[54] LOG-LOG SCALE REFRACTOR

[75] Inventor: James L. Smith, Grand Prairie, Tex.

[73] Assignee: The United States of America as represented by the Secretary of the Army, Washington, D.C.

[21] Appl. No.: 158,008

[22] Filed: Jun. 9, 1980

[51] Int. Cl.³ .............................................. G02B 13/18
[52] U.S. Cl. ................................................... 350/432
[58] Field of Search ................. 350/432; 351/169, 176

[56] References Cited

U.S. PATENT DOCUMENTS

| | | | |
|---|---|---|---|
| 521,064 | 6/1894 | Weyde | 350/432 |
| 1,750,883 | 3/1930 | Ford | 350/432 X |
| 3,508,811 | 4/1970 | Yoshida | 350/432 |
| 4,279,480 | 7/1981 | Bettiol et al. | 350/432 X |

FOREIGN PATENT DOCUMENTS 54-143662  11/1979  Japan .................................. 350/432

Primary Examiner—John K. Corbin
Assistant Examiner—Scott J. Sugarman
Attorney, Agent, or Firm—Nathan Edelberg; Robert P. Gibson; Harold W. Hilton

[57] ABSTRACT

A unique shape is mathematically prescribed for a "lens" which refracts collimated light passing through it in such a way that any linear scale modulating the incident light is distorted into a logarithmic scale at the final image plane.

2 Claims, 7 Drawing Figures

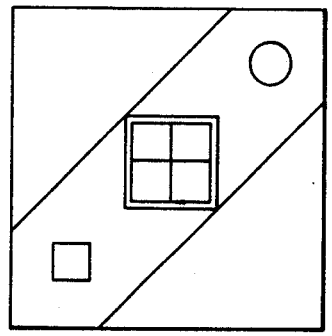
FIG. 4A
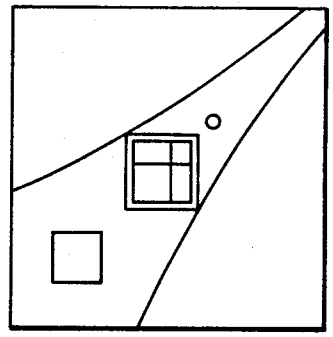
FIG. 4C
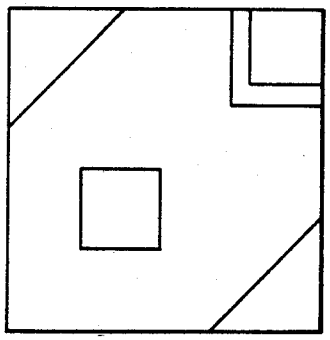
FIG. 4B
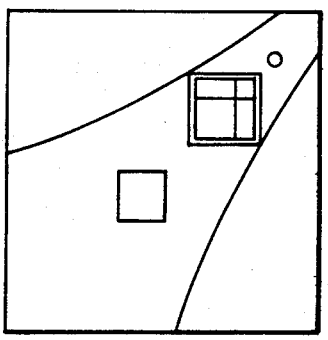
FIG. 4D
FIG. 4

LOG-LOG SCALE REFRACTOR

THE LOG-LOG SCALE REFRACTOR DEDICATORY CLAUSE

The invention described herein may be manufactured, used and licensed by or for the Government for governmental purposes without the payment to me of any royalties thereon.

BACKGROUND OF THE INVENTION

Replotting data from a linear scale onto a logarithmic scale in order to test the data for exponential dependence has always been time consuming and often tedious. A need exists for display systems which can optically convert a linear representation to a logarithmic one.

This conversion is also needed for more sophisticated technology. With the advent of coherent optical correlation technology, character recognition (for reading machines) and terrain pattern recognition (for aerial reconnaissance, etc.) programs having received great emphasis in optical data processing. By means of lasers, halographic quality lenses and the fabrication of matched filters in the so-called Fourier Transform plane, certain patterns hidden among a confusion of shapes or background noise can be "recognized." This recognition consists of a strong optical signal in an output plane which contains the cross-correlation between the input image and matched filter. The location of this strong optical signal in the output plane is indicative of the location of the recognizable pattern in the input image. This recognition ability persists despite variation in image intensity, certain obscurations, and translation of the input image. However, if there is a magnification or scaling factor change between the input image and that which contained the reference pattern from which the matched filter was made, no strong, localized optical signal will result in the output plane. In other words, image recognition cannot take place after pattern magnification. This makes it impossible for coherent optical correlation systems to rapidly indicate recognizable content in an aerial reconnaissance photo unless the altitude (or, at any rate, the scaling of photo content) is identical for reference photos (from which matched fibers are made) and the photos to be examined.

The log-log scale refractor of the present invention is, in part, designed to solve the aforementioned problem of replotting data for which a logarithmic rendition is desired. This may be done quite simply by photographing the linear plot with polaroid transparency film, placing the transparency in a well-collimated light beam, allowing the modulated beam to pass through the log-scale lens (or simply log-scale lens, if desired), and viewing the result in a screen appropriately placed.

The log-log scale refractor is also disposed to eliminate the restriction that scaling factor (or magnification) be the same for reference and examined patterns in order to obtain "recognition" in coherent optical correlation systems. Such is possible with the log-log scale refractor. Provided the image content at the zero coordinate of the log-log scale refractor plane is the same for both reference pattern and examined pattern, a magnification of the examined pattern simply converts to translation of the log-log scale image. The optical correlation is fully capable of pattern recognition when mere translation is involved. The key to making this possible is adapting the system to recognize the log-log scale rendition of patterns, rather than linear scale renditions.

BRIEF DESCRIPTION OF THE DRAWING

FIG. 4 is a view illustrating the manner in which image magnification between 4a and 4b is equivalent to mere translation in their log-log scale images 4c and 4d.

DESCRIPTION OF THE PREFERRED EMBODIMENT

Figure 1:
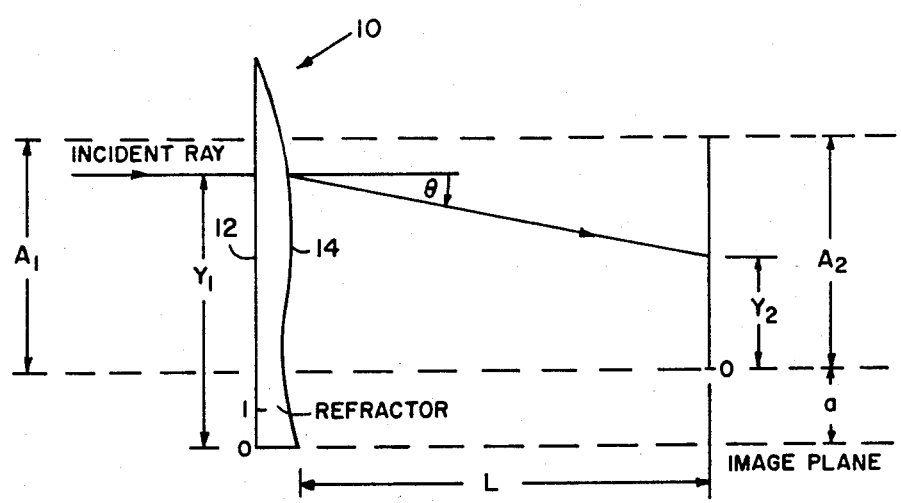
FIG. 1 is a diagrammatic view illustrating a refractor having curvature as a function of one of the planar coordinates ($Y_1$ for the refractor plane and $Y_2$ for the image plane) and also illustrating the path of an incident ray normal to the refractor.

As seen in FIG. 1, a refractor 10 includes a pair of surfaces 12 and 14. Surface 14 is provided with a predetermined curvature and surface 12 is planar.

Figure 2:
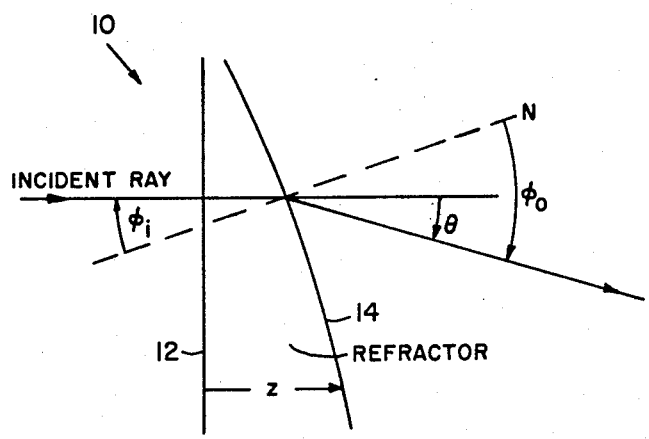
FIG. 2 is a view similar to FIG. 1 illustrating the ray path in detail.
Figure 3:
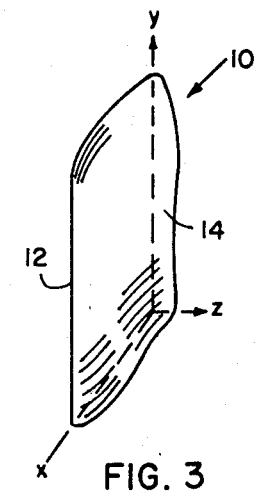
FIG. 3 is a perspective view of the log-log lens of the present invention.

FIGS. 1 and 2 show a typical configuration depicting curvature as a function of one of the planar coordinates ($y_1$ for the lens plane, $y_2$ for the image plane), and it also illustrates the path of an incident ray, normal to the refractor. Parameters $A_1$ and $A_2$ are arbitrary equal distances measured in terms of $y_1$ and $y_2$ units, (inches, meters, etc), respectively; a is the displacement between origins in the refractor and image planes while L is the separation between the planes (both a and L are measured in the same units as $y_1$); $\theta$ is the angle through which the LLS refractor bends the incident ray, while $\phi_i$ and $\phi_o$ are the angles of ray incidence and exit with respect to the curved surface normal N(angles measured clockwise are negative, counterclockwise are positive); and n is the refractive index of the LLS refractor material. For $Y_2 = \log Y_1$, then $$\tan\phi_i = \tan\theta / (n\sqrt{1 + \tan^2\phi} - 1), \quad (1)$$

where $$\tan\theta = -(y_1 - a - (A_1/A_2)\log y_1)/L. \quad (2)$$

For cases where $\tan^2\theta \ll 1$, Eq. (1) simplifies to $$\tan\phi_1 = \tan\phi/(n-1). \quad (3)$$

For curvature along two orthogonal directions, it is convenient to express the distance Z from the planar side of the refractor to the curved surface (thickness) in terms of the lens plane coordinates x and y. The following is derived from the Eqs. (2) and (3) by extension to two planar coordinates and employing a notational change. The applicable formula here is a small angle approximation ($\tan^2\phi \ll 1$) and is given by $$Z(x,y) = [\tfrac{1}{2}(y^2 + x^2) - (A_1/A_2)(0.43429)(y \ln y + x \ln x - y - x) - a(y + x)]/L(n-1) + Z(0,0), \quad (4)$$

where $Z(0,0)$ is the lens thickness at $x = y = 0$, and, again, n is the refractive index of lens material.

Mathematics has been presented assuming log = log base 10. The natural logarithm (denoted ln) relationship between incident and final image may, however, be desired; for this case, the factor 0.43429 in Eq. (4) should be replaced by unity.

The LLS refractor is designed only for appropriate refraction of well-collimated light, parallel to its axis. It is not a lens in the general sense that an image is formed of an object located at a finite distance from it. Where collimated light contains slight divergence, best results will be attained if the collimating lens also focuses the incident image on or slightly beyond the LLS refractor plane.

The log-log scale refractor is fashioned from a material which is transparent to the wavelength of electromagnetic radiation of interest. Normally, this radiation will be light (4000–6000 Angstroms). The refractor is aspheric and possesses the property of refracting collimated light (parallel to its axis) in such a way that the coordinates of a ray intersecting an image plane a distance L from the lens are logarithmically related to the coordinates in the plane of the lens. The two sets of coordinate are two-dimensional and posses origins in their respective planes.

The effect of the LLS refractor is to modify the coordinates of an image modulating the incident light beam so that, if a reference point on the incident image remains at the origin throughout the system, incident image magnification is converted to mere displacement in the image plane.

The description of a log-log scale refractor is simultaneously the description of a log-scale refractor. Where coordinate transformation in only one dimension is required, the lens will possess the prescribed curvature in only one dimension.

The LLS refractor thickness (as well as thickness variation) has been implicitly assumed as very small compared to L. If the thickness is large, L should be taken as the distance from the plane defined by $Z = Z_{avg}$ (Where $Z_{avg}$ is the average value of Z) to the image plane. The thickness *variation* should always be kept small compared to L.

It was emphasized that there must be a common point at the origin of the log-log scale refractor plane for both reference pattern and examined pattern in order that magnification convert to translation. In other words, if the coordinates x, y of an examined pattern are both magnified *and* translated (e.g., $ax+b$, $cy+d$), simple translation of the log-log scale image is not the entire result. If connected to a coherent optical processor with a matched filter for the image, the correlation signal would decrease. This could very well be the basis of a missile homing system based on optical correlation. Via feedback circuits, the correlation signal keeps the missile on an optically recognized target, despite the image magnification which occurs with the approach. If wandering from an optical reference point occurs, the drop of correlation signal is sensed and automatic course corrections are made.

I claim:

1. A logarithmic scale refractor comprising:
   (a) a body transparent to a predetermined wavelength of electromagnetic radiation;
   (b) a first surface of said body being planar;
   (c) a second surface of said body having a predetermined curved configuration to define a body of varying thickness whereby the body refracts collimated light, incident parallel to its axis, in such a manner that the coordinates of a ray intersecting an image plane a distance L from the lens are logarithmically related to the coordinates in the plane of the refractor, said second surface being defined by $$\tan \phi_i = \tan \theta / (n \sqrt{1 + \tan^2 \theta} - 1),$$

where $$\tan \phi = -(y_1 - a - (A_1/A_2) \log y_1)/L$$

and where $y_1$ is in the refractor plane, $y_2$ is in the image plane, $A_1$ and $A_2$ are arbitrary equal distances measured in terms of $y_1$ and $y_2$ units, a=displacement between origins in the lens and image planes while L is the separation between the refractor and image planes, both A and L being measured in the same units as $y_1$, $\phi$=the angle through which the lens bends the incident ray, $\phi_i$ and $\phi_o$ are the angles of ray incidence and exit with respect to the curved surface normal N, and n is the refractive index of the lens material.

2. A logarithmic scale refractor comprising:
   (a) a body transparent to a predetermined wavelength of electromagnetic radiation;
   (b) a first surface of said body being planar;
   (c) a second surface of said body having a predetermined curved configuration to define a body of varying thickness whereby the body refracts collimated light, incident parallel to its axis, in such a manner that the coordinates of a ray intersecting an image plane a distance L from the lens are logarithmically related to the coordinates in the plane of the refractor, said second surface being defined by $$Z(x,y) = [\tfrac{1}{2}(y^2+x^2) - (A_1/A_2)(0.43429)(y \ln y + x \ln x - y - x) - a(y+x)]/L(n-1) + Z(0,0),$$

where Z (0,0) is the lens thickness at $x=y=0$, n=the refractive index of the lens material.

* * * * *